(12) United States Patent
Smith et al.

(10) Patent No.: US 7,821,981 B2
(45) Date of Patent: Oct. 26, 2010

(54) SATELLITE SWITCH COMMUNICATION OVER A NETWORK

(75) Inventors: Michael Smith, San Jose, CA (US); Prashant Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 11/318,711

(22) Filed: Dec. 27, 2005

(65) Prior Publication Data

US 2007/0147279 A1    Jun. 28, 2007

(51) Int. Cl.
*H04B 7/185* (2006.01)

(52) U.S. Cl. .................. 370/316; 370/397; 370/242; 709/227

(58) Field of Classification Search ............. 370/316, 370/397; 709/227
See application file for complete search history.

(56) References Cited

U.S. PATENT DOCUMENTS

| | | | |
|---|---|---|---|
| 7,403,474 B2 * | 7/2008 | Rorie | 370/219 |
| 2002/0138628 A1 * | 9/2002 | Tingley et al. | 709/227 |
| 2002/0156612 A1 * | 10/2002 | Schulter et al. | 703/23 |
| 2005/0063395 A1 | 3/2005 | Smith et al. | |
| 2005/0163115 A1 | 7/2005 | Dontu et al. | |

* cited by examiner

*Primary Examiner*—Patrick N Edouard
*Assistant Examiner*—Chuck Huynh
(74) *Attorney, Agent, or Firm*—Cindy Kaplan

(57) ABSTRACT

A method for interconnecting a satellite switch and a virtual switch for communication over a network includes transmitting a multicast packet containing a satellite identifier over the network and receiving a response multicast packet containing the satellite identifier, a satellite index associated with the satellite switch, and a virtual switch index associated with the virtual switch transmitting the response packet. The virtual switch index is mapped into a destination address and the destination address is inserted into a satellite packet. The satellite packet is then transmitted over the network to the virtual switch.

19 Claims, 7 Drawing Sheets

SATELLITE SWITCH COMMUNICATION OVER A NETWORK

BACKGROUND OF THE INVENTION

The present invention relates generally to communication networks, and more specifically, to satellite switch communication with a network device, such as a virtual switch, over a network.

Redundant switches and links are often provided in a network to provide improved network reliability. If a switch or link fails, a redundant switch or link, already in place within the network is quickly enabled to replace the failed switch or link. For example, a core layer in a network may include two switches, each of which is connected with network devices in a distribution layer for redundancy purposes. Similarly, access layer switches in wiring closets (referred to herein as satellite switches) are connected to the two devices in the distribution layer. Since the redundant switch is typically enabled as a replacement more quickly than the failed component can be replaced or repaired, having redundant devices provides a more reliable network. Although this network topology has proven to be quite robust and reliable, it has some disadvantages. For example, each pair of redundant switches represents two points of management. If multiple redundant devices are used in a network, management of the network may become more complicated due to the need to have a different point of management for each network device.

To overcome this management complexity, a virtual switch including different network devices, which collectively operate as a single logical network device, may be treated as a single point of management. The satellite switch may then be controlled by the directly connected virtual switch or through chaining multiple satellites in series. A possible deployment scenario is one where the satellite switches are connected via an optical ring and the ring equipment is not satellite-aware. An option for transporting traffic in this scenario is to provide a pure Layer 1 (L1) transport such as an optical SONET/SDH ring that transports the entire Ethernet packet without examining its contents. However, this is limited to L1 connectivity and is inefficient since it cannot constrain traffic in a multipoint environment.

It would be desirable to deploy satellite switches which are not directly connected to a satellite-aware switch at the link layer, but connected through a traditional Layer 2 (L2) or Layer 3 (L3) network device. It is also desirable to allow multiple satellite switches within the L2 or L3 domain and to allow multiple virtual switches using the same L2 or L3 domain as a virtual backplane interconnect.

SUMMARY OF THE INVENTION

A method and system for interconnecting a satellite switch and a virtual switch for communication over a network are disclosed herein. In one embodiment, the method generally comprises transmitting a packet containing a satellite identifier over the network and receiving a response packet containing the satellite identifier, a satellite index associated with the satellite switch, and a virtual switch index associated with the virtual switch transmitting the packet. The virtual switch index is mapped into a destination address and the destination address is inserted into a satellite packet. The satellite packet is then transmitted over the network to the virtual switch.

In another aspect of the invention, the satellite switch is configured with a network device index associating the satellite switch with a network device and a method for communicating between the satellite switch and network device generally comprises mapping the network device index into a destination address of a header, inserting the header into a packet, and transmitting the packet over the network to the network device.

In yet another aspect of the invention, a method for controlling a satellite switch by a virtual switch over a network generally comprises receiving a packet containing a satellite identifier over the network and transmitting a response packet containing the satellite identifier, a satellite index associated with the satellite switch, and a virtual switch index associated with the virtual switch transmitting the packet. The method further includes mapping the satellite switch index into a destination address, inserting the destination address into a packet, and transmitting the packet over the network to the satellite switch.

A computer program product for communication between a satellite switch and a network device over a network generally comprises code that maps the network device index into a destination address of a header, code that inserts the header into a packet, code that transmits the packet over the network to the network device, and a computer-readable medium that stores the codes.

A system for communication between a satellite switch and a network device over a network generally comprises means for mapping the network device index into a destination address of a header, means for inserting the header into a packet, and means for transmitting the packet over the network to the network device.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. A method and system described herein allow for the interconnection between a network device and satellite switch to include various networks including L2 and L3 networks. The satellite switches can then be controlled by the network device for which there is no direct connection.

Virtual Switch

Figure 1A:
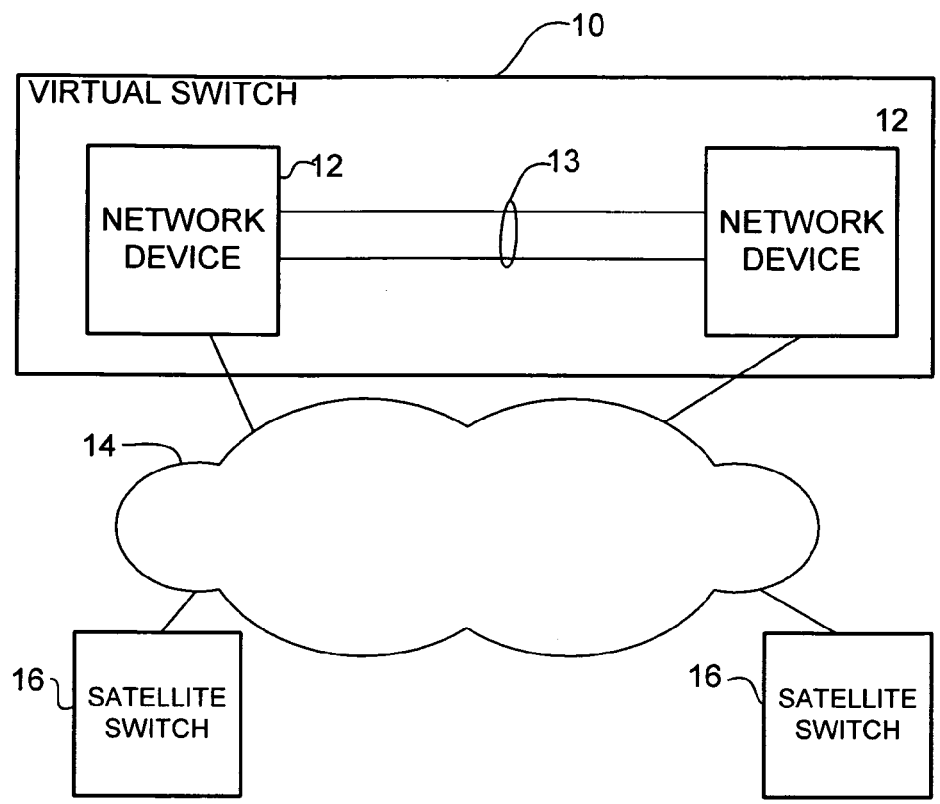
FIG. 1A illustrates a physical view of a virtual switch and satellite switches in communication over a network.
Figure 1B:
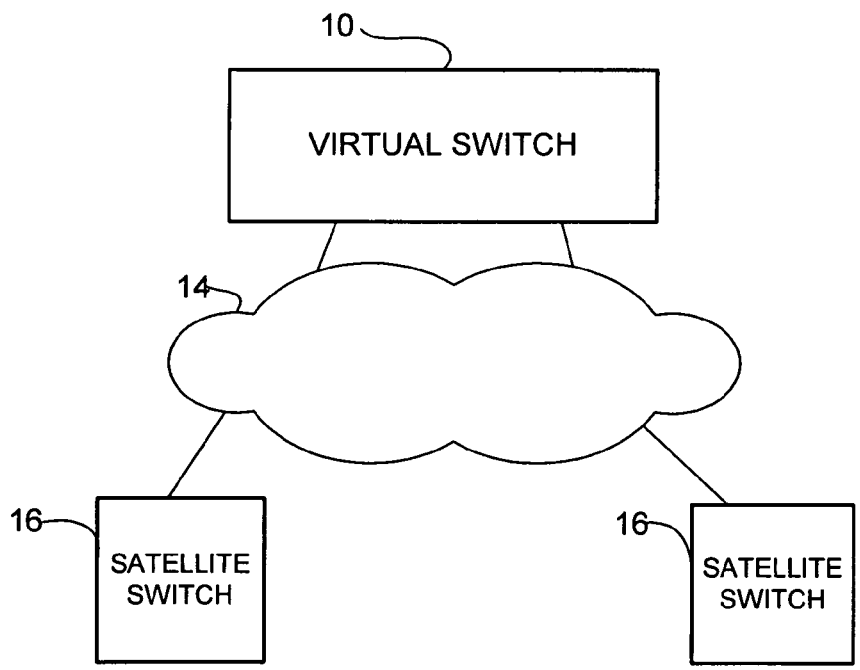
FIG. 1B illustrates a logical view of the virtual switch and satellite switches of FIG. 1A.

Referring now to the drawings, and first to FIGS. 1A and 1B, a virtual switch 10 is shown in communication with satellite switches 16 over a network 14. It is to be understood that the term "switch" as used herein with respect to the virtual switch or satellite switch, applies to switches, routers, and similar network devices. FIG. 1A is a network diagram that depicts a high-level physical view of the virtual switch 10, which includes two network devices 12 in communication via virtual switch link 13. Satellite switches (e.g., access layer switches) 16 are in communication with the network devices (e.g., distribution layer switches) 12 of virtual switch 10 over a network 14, as described below with respect to FIGS. 2 and 3.

FIG. 1B depicts a logical view of the virtual switch 10. The satellite switches 16 interact with the virtual switch 10 as it if were a single network device and all devices external to the virtual switch 10 view it as a single network device. The switch 10 provides forwarding and control plane processing to the satellite port traffic. The virtual switch operates as a single logical unit, while encompassing at least two physical chassis (network devices 12). Each virtual switch 10 includes a master chassis and at least one slave chassis. The master chassis is configured to control the slave chassis. The master chassis and the slave chassis communicate via the virtual switch link 13 according to a virtual switch link protocol. The virtual switch link 13 carries control and data traffic between the two chassis and acts to extend the internal data plane (e.g., fabric, data bus) between the peer chassis. According to one embodiment, the virtual switch link 13 is an Etherchannel port bundle that is run according to the virtual switch link protocol.

Details of an exemplary virtual switch 10 are provided in U.S. patent application Ser. No. 10/666,306, entitled "Virtual Network Device", filed Sep. 18, 2003, which is incorporated by reference herein in its entirety.

It is to be understood that the virtual switch described above is only one example of a satellite-aware (control) switch and that the term "virtual switch" as used herein includes any type of network device configured to communicate with a satellite switch, as described below. Also, a non-virtual distribution switch may be the network device used to control the satellite switch.

Satellite Switch

The virtual switch model described above allows the satellite switches 16 to communicate with a single virtual switch 10. In one embodiment, the satellite (remote) switch 16 is an access layer device that does not make independent forwarding decisions. The satellite switch 16 addresses the management of the wiring closet by providing a simple switch with no local forwarding capability. The satellite switches 16 rely on the distribution layer switches 12 to perform L2 or L3 forwarding functions used to determine how to switch packets. They effectively act as additional ports of the distribution layer switches. The satellite switches 16 each include uplink interfaces and a plurality of ports coupled to a network client device (e.g., switch, router, personal computer, workstation, Internet server, network appliance, handheld computing device, etc.). The satellite switches 16 forward packets received from network client devices to the distribution layer. The distribution layer determines how those packets will be forwarded through the network and selects ports in the satellite switch 16 from which to output a packet. The forwarding intelligence (control information) is thus provided by the upstream switch.

The satellite switch 16 is therefore controlled by a control switch, which may be the virtual switch 10 or a non-virtual switch, such as a single distribution layer switch 12, for example.

In one embodiment, the virtual switch 10 and satellite switch 16 each include a local target agent which tracks assignment of one or more unique forwarding indices (referred to herein as LTL (Local Target Logic) indices) assigned to each port. Details of the local target agent and related indices are provided in U.S. patent application Ser. No. 10/690,348, entitled, "Port-Based Loadsharing for a Satellite Switch", filed Oct. 21, 2003, which is incorporated by reference herein in its entirety.

Connection of the Satellite Switch and Virtual Switch over a Network

Figure 2:
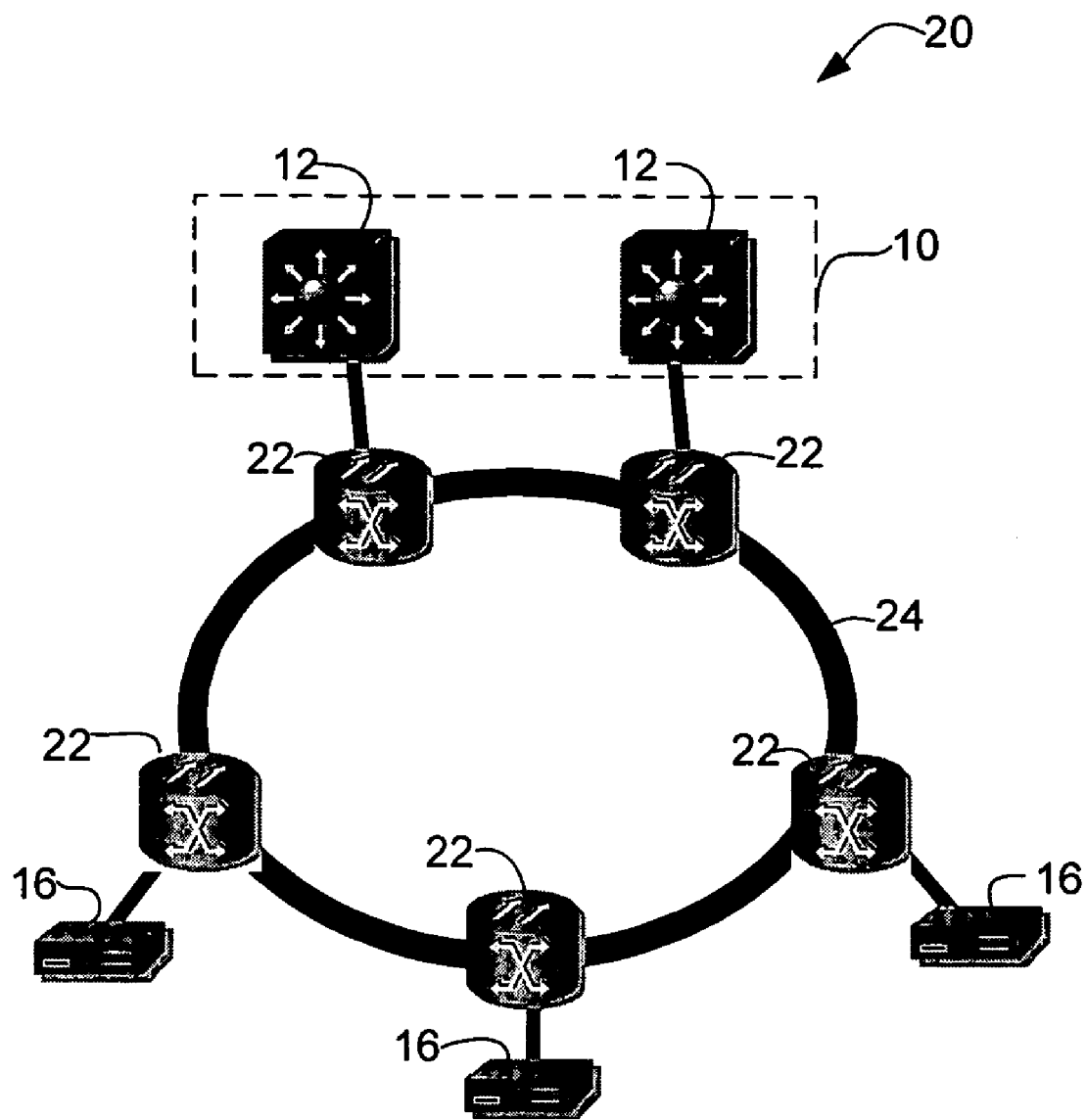
FIG. 2 illustrates an example of the satellite switches in communication with the virtual switch over an RPR network.
Figure 3:
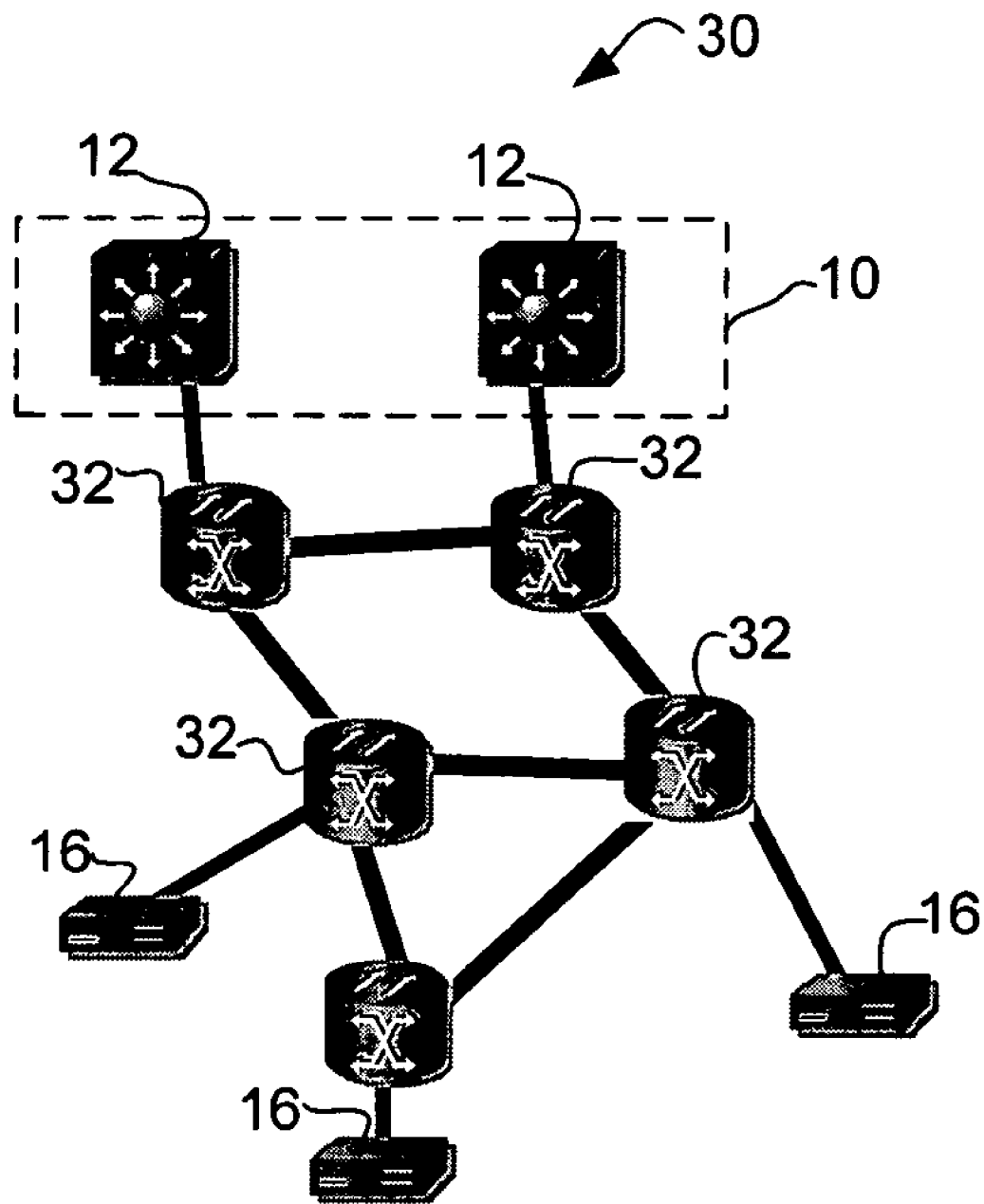
FIG. 3 illustrates an example of the satellite switches in communication with the virtual switch over a generic Layer 2 network.

The method and system described herein allow the satellite switch 16, which is not directly connected to the virtual switch 10, to be controlled by the switch across a network 14. The switch 10 and satellite switch 16 may be connected across various types of networks. For example, the satellite switch 16 may be connected to the virtual switch 10 via an L2 network or L3 network. FIG. 2 illustrates a network example using an L2 aware service such as extended bridging RPR (Resilient Packet Ring). The satellite switches 16 are connected via RPR equipment 22 over a ring 24 connected to the network devices 12 of the virtual switch 10. FIG. 3 illustrates an L2 network example in which the satellite switches 16 are connected to the network devices 12 via traditional L2 equipment 32. As described below, the present invention allows multiple virtual switches 10 to share the same L2 or L3 infrastructure.

It is to be understood that the network configurations shown in FIGS. 2 and 3 are provided only as examples and various other network topologies may be used. Furthermore, the method and system described herein may be used to transport data between a satellite switch 16 and a virtual switch 10 over any type of L2 network, L3 network, or any combination thereof (e.g., encapsulation of VLAN Layer 2 PDUs across a MPLS backbone), including using tunneling, bridging, or any other method, as is well known by those skilled in the art.

The method and system described herein may also be used in Metro Ethernet applications. By allowing the satellite to be controlled by different virtual switches, the satellite ports can be partitioned into different virtual switches.

Communication Between Satellite Switch and Virtual Switch

An example of forwarding traffic in virtual network devices in which a satellite switch is directly connected to the virtual switch is provided in U.S. patent application Ser. No. 10/826,888, entitled "Distributed Forwarding in Virtual Network Devices", filed Apr. 16, 2004 and U.S. patent application Ser. No. 10/666,306 (referenced above), which are incorporated by reference herein in their entirety. With a direct connection between the satellite switch 16 and virtual switch 10, the traffic is directed to the correct satellite using a destination index (e.g., LTL index) in a header (e.g., CSH (Cisco Satellite Header), which immediately follows the preamble.

In the following example, packets are sent over an L2 Ethernet network. As previously discussed, other types of networks may be used to transport the packets between the satellite switch 16 and the virtual switch 10. As used herein, the terms "packet" and "frame" have the same meaning. The sizes of each field do not necessary correspond with the number of bytes in each filed. The field types described herein are purely illustrative. Moreover, each field may contain one or more subfields.

Since the satellite switch 16 and virtual switch 10 communicate over an L2 network, multiple satellites may exist within the same L2 domain. A mechanism is therefore provided to direct traffic to the correct satellite. VLANs (Virtual Local Area Networks) allow the creation of multiple virtual L2 networks within a single physical L2 network. Since the L2 network is essentially the backplane of the virtual switch 10, this allows the VLAN field to be used to separate the traffic of different virtual switches.

A header is encapsulated within a packet by inserting an additional L2 header at the beginning of the frame. In order to transport frames over the network, the frame preferably includes an Ethernet header so that forwarding can be performed using the destination MAC address and VLAN fields. As described in detail below, an index, which selects a subset of satellites, is mapped into a modified destination MAC address and the VLAN field of the L2 header is used to define which virtual switch that the packet belongs.

In order to direct traffic to the correct satellite over an L2 network, a mapping from a destination index to a destination MAC address is used. In one embodiment, an index, such as the LTL index referred to above, may be used to identify the satellite switch, virtual switch, or specific ports of the satellite switch or virtual switch. The indices are configured, for example, such that they can select multiple ports which may be on different satellites (i.e., flood indices). Thus, the MAC address is preferably multicast or broadcast at least for those indices. Pruning techniques can be used in the L2 network to isolate the packets to only those satellites requiring the traffic.

Unicast MAC addresses may be used for the unicast indices. However, this may not always apply due to cases such as an Etherchannel which is a single logical port split across multiple satellites. In order to utilize unicast MAC addresses, the pool of MAC addresses needs to come from the satellite' pool or from the controlling virtual switch's pool. If it comes from the virtual switch 10, the number of MAC addresses given to each virtual switch must be very large to accommodate the maximum number of connected satellite switches 16. If the MAC address pool comes from the satellite switch 16, there will be a separate range of MAC addresses for each satellite switch and this will complicate the port ASIC implementation. As a result, it is preferred to use multicast MAC addresses even for unicast indices.

Figure 4:
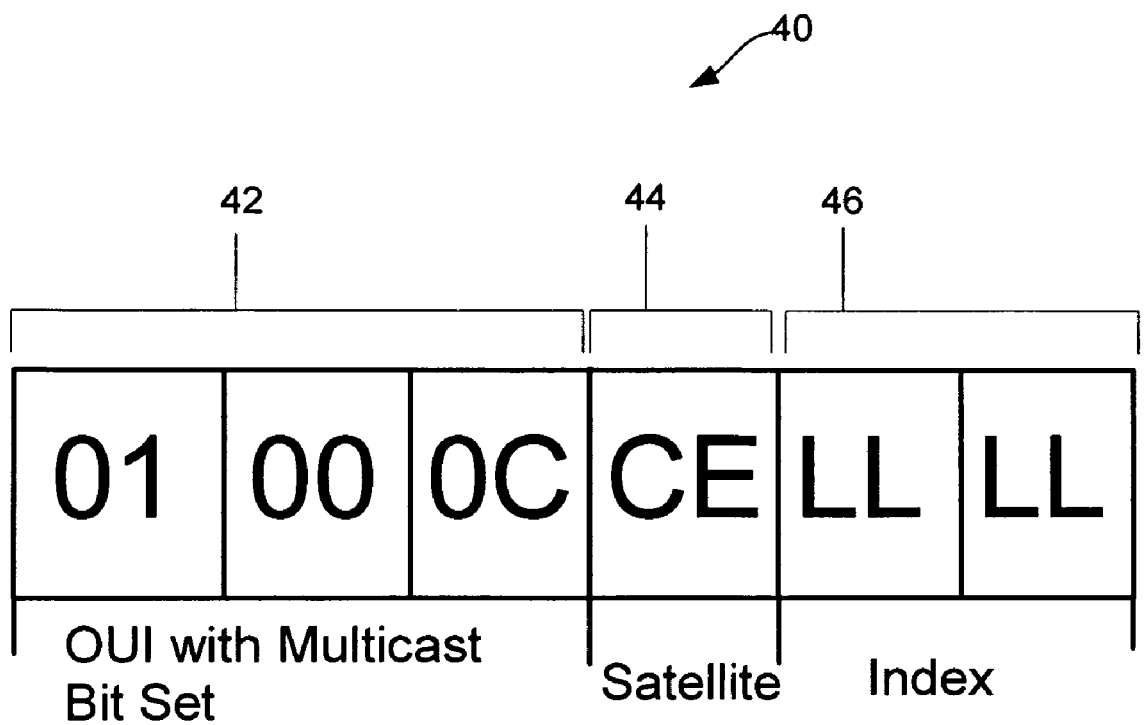
FIG. 4 shows one example of a destination MAC address format used to associate the satellite switch with the virtual switch.

One example of a destination MAC address format is shown in FIG. 4. In this example, the MAC address 40 consists of three fields 42, 44, 46. The first three bytes (field 42) contain an OUI (Organizational Unique Identifier) (e.g., Cisco OUI, 00-00-0C), with the multicast bit (LSB (Least Significant Bit) of first byte) set. The following byte (field 44) is reserved for satellite communication. The subsequent two bytes (field 46) are used to carry the index.

As previously discussed, the method and system may also be used in the case where the virtual switch 10 is connected to the satellite switch 16 via an L3 network. In order for the virtual switch 10 and satellite switch 16 to communicate over an L3 network, the indices are mapped to L3 multicast addresses instead of L2 multicast addresses. Instead of using VLAN to segregate multiple switches, LDP may be used with MPLS, for example. Also, IGMP (Internet Group Management Protocol) may be used to create groups within the network. VPNs may be used to separate the virtual switches (e.g., MPLS VPNs) or a virtual network overlay may be created using GRE tunnels extending to each satellite. The creation of the VPNs may be done through static configuration.

Bringing Satellite Switch Online

In order to bring the satellite switch 16 online, the satellite is first configured with a virtual switch identifier which indicates the VLAN to be used within the L2 domain. This allows the satellite switch 16 to know which virtual switch 10 to join within a shared L2 domain. The default value may be set, for example, to VLAN 1.

Figure 5:
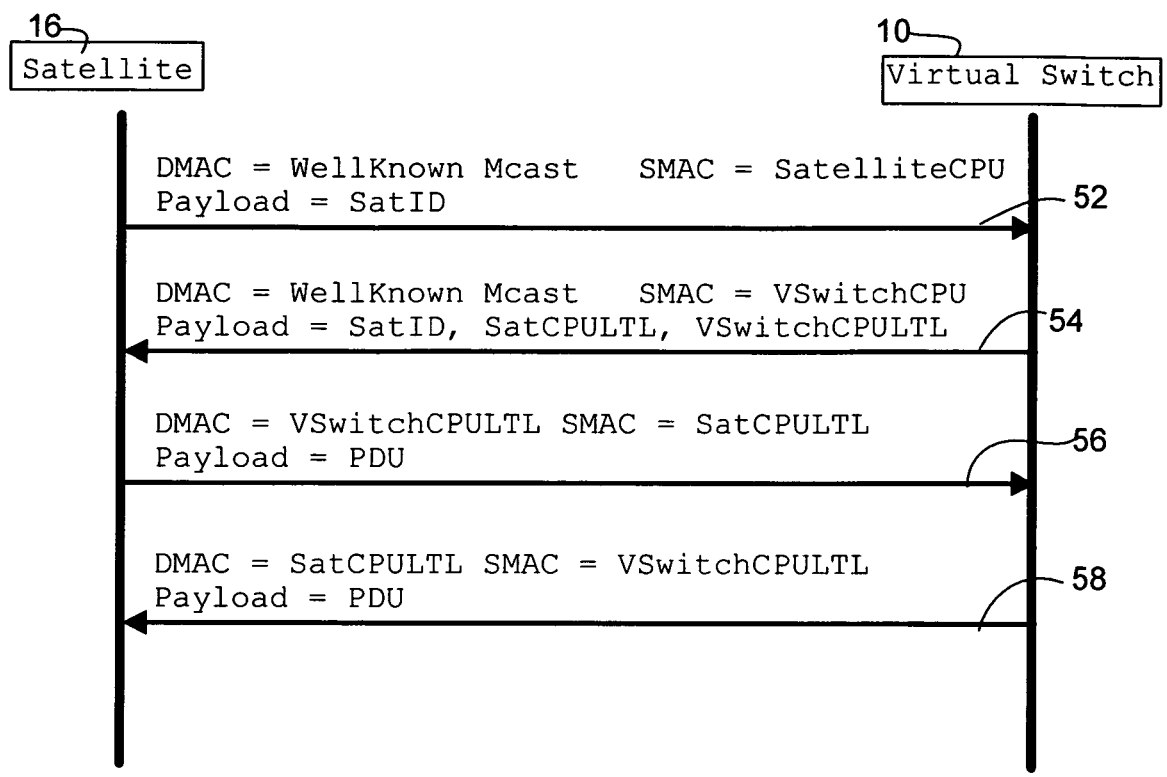
FIG. 5 illustrates communication between the satellite switch and virtual switch to configure the satellite switch with a virtual switch identifier.

A bring up session is negotiated between the satellite switch 16 and virtual switch 10 across the L2 network. As illustrated in FIG. 5 (transmission 52), the satellite switch 16 transmits a packet to a well known multicast destination address (DMAC), when link up is detected. Since the satellite uplinks are treated as an Etherchannel, the packet is sent on only one uplink. The source MAC address (SMAC) is that of the satellite CPU. The packet also contains a unique satellite identifier (e.g., the same satellite CPU MAC address) (SatID) in the payload. The well known destination MAC address is sent through non-satellite aware bridges, but is redirected to the CPU by the virtual switch 10 and satellite switches 16.

Upon receipt of the packet, the virtual switch 10 redirects the packet to the CPU via recognition of the well known MAC address in the port ASIC. All of the virtual switch connections into the L2 network that are configured as satellite uplinks are placed in the same Etherchannel. It may be desirable to allow multiple satellite uplink Etherchannels to enable connecting the virtual switch 10 to multiple disparate L2 networks.

As illustrated in FIG. 5 (transmission 54), the virtual switch responds with a packet that also contains the well known destination MAC address (DMAC). The source MAC address (SMAC) is that of the virtual switch CPU (VSwitch-CPU). The payload contains the satellite identifier (SatID) from the original packet transmitted by the satellite switch 16 (in transmission 52). The payload also contains the indices (SatCPULTL, VSwitchCPULTL)) to be used for sending to the satellite CPU and virtual switch CPU.

The initial two packets sent using the well known destination MAC address will be received by all satellite CPUs, but can be quickly discarded based on the source MAC address and/or the embedded intended satellite identifier.

Subsequent communications take place inband using the indices and occur in the same manner described in U.S. patent application Ser. Nos. 10/690,348 and 10/826,888, referenced above, except that the bring up is sent over the Etherchannel, not the individual satellite links. An example of data transferred in subsequent communications is shown at lines 56 and 58 of FIG. 5. The destination MAC address for packets transmitted from the satellite switch 16 contains the virtual switch index (VSwitchCPULTL) and the source MAC address contains the satellite index (SatCPULTL) (transmission 56). For packets transmitted from the virtual switch, the destination MAC address contains the satellite index (SatCPULTL) and the source MAC address contains the virtual switch index (VSwitchCPULTL) (transmission 58).

The port ASIC handles the L2 packet encapsulation. The header is appended to the packet by the egress port (e.g., by an ASIC of the egress port) and stripped off on the other side by the ingress port.

Figure 6:
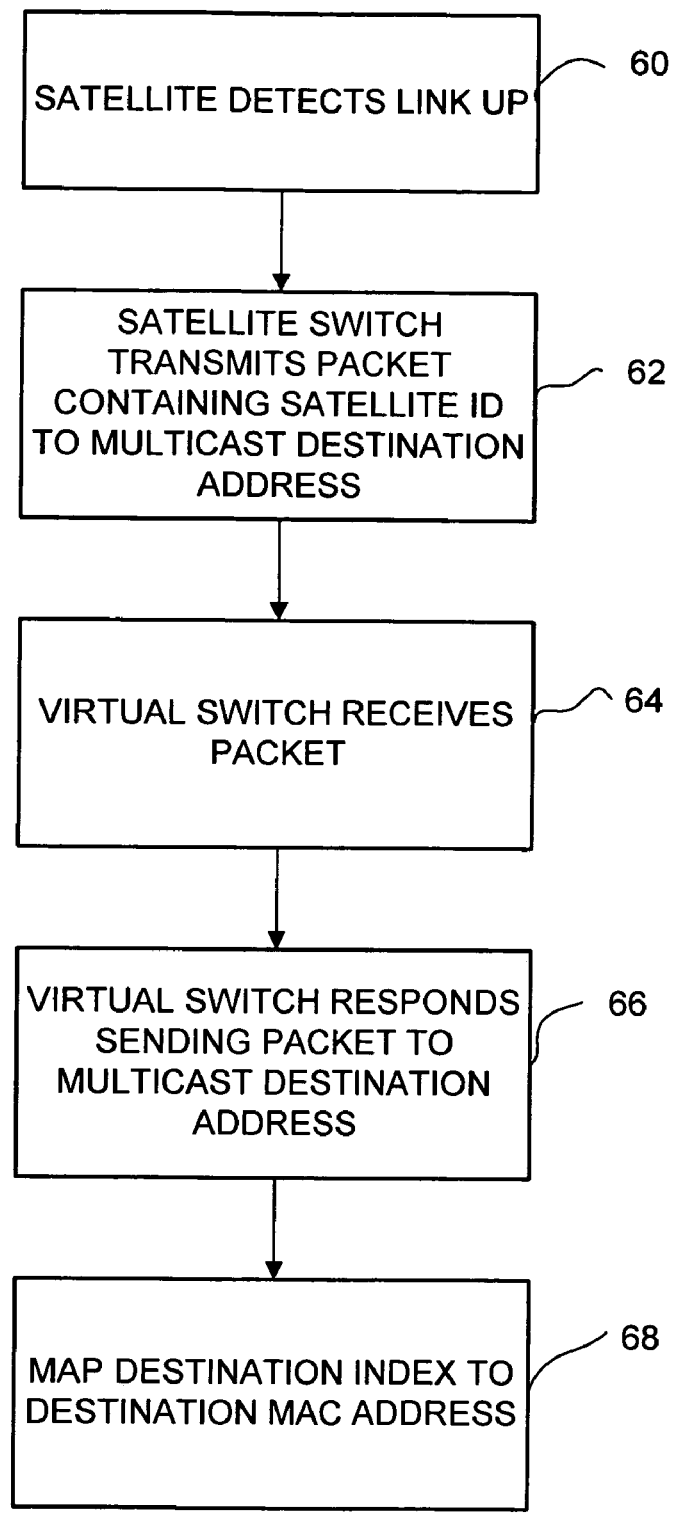
FIG. 6 is a flowchart illustrating a process for configuring the satellite switch for communication with the virtual switch.

FIG. 6 is a flowchart illustrating a process for bringing the satellite online and communicating with the virtual switch. At step 60 a link up is detected on one of the satellite's uplinks. The satellite switch 16 transmits a packet containing the satellite ID to a well known multicast destination address, with the source MAC address set to the satellite CPU (step 62). Virtual switch 10 receives the packet (step 64) and directs it to the CPU. The virtual switch 10 then sends a response packet containing the satellite ID, satellite index, and virtual switch index to the well known destination MAC address, with the source address set to the virtual switch (step 66). The satellite switch 16 now belongs to the correct multicast group for communication with the identified virtual switch 10 over the network. The destination index is mapped to a destination MAC address (step 68) and the destination MAC address, which contains the satellite index, is inserted into a satellite packet transmitted from virtual switch 10 to the satellite switch 16. The satellite packet is used to send data and control information such as identification of a port of the satellite switch to send data, from the virtual switch 10 to the satellite switch 16.

The above example refers to communication between a satellite switch and a virtual switch, however, it is to be understood that the satellite switch may also communicate with any type of network device including a non-virtual switch using the method and system described herein.

Network Protocol Interaction

Since the backplane of the virtual switch has moved from individual point-to-point links (in the case where the satellite switch is directly connected to the virtual switch) to an L2 (or L3) network, there is a need to run the standard set of L2 (or L3) protocols on the backplane network. From the view of the backplane network, the satellite uplinks on the virtual switch side and the satellite side will act as host ports. In the case of an L2 network, this limits the L2 protocol interactions to protocols such as GVRP (GARP (Generic Attribute Registration Protocol) VLAN Registration Protocol) and GMRP (GARP Multitask Registration Protocol). These two protocols allow for optimal forwarding within the backplane network. Similarly, VTP (VLAN Trunking Protocol) and VTP pruning may be used.

It should be noted that it is possible for non-satellite uplinks on the virtual switch to also connect to the backplane network. In this case, the non-satellite uplinks will not use the special L2 encapsulation and will run L2 protocols as a normal switch port. The switches comprising the backplane network will operate as a normal L2 network.

Failure Detection

Since the link layer connectivity is not available, probing of the satellite and virtual switch sanity is done through BFD-like constructs. Failure of the satellite switch 16 will be detected by the virtual switch 10 through such probing and the satellite will be marked as offline.

Failure of one of the network devices 12 of the virtual switch 10 will trigger a switchover within the virtual switch and is essentially invisible to the satellites in the network. If the entire virtual switch 10 fails, the satellite switch 16 is lost and will detect the failure through BFD-like probing. At this point, the satellite switch 16 begins periodically transmitting the initial packet to the well known destination MAC address in an attempt to discover the virtual switch 10.

If a single satellite uplink fails, neither the virtual switch 10 nor satellite switch 16 will be affected. It will be treated in the same manner as the failure of a link within an Etherchannel. If the last satellite uplink is lost, the virtual switch 10 and satellite switch 16 will lose connectivity and the satellite will restart transmitting the initial packet to the well known destination MAC address. The virtual switch 10 will take the satellite offline until rediscovery and initialization takes place.

Network Device

Figure 7:
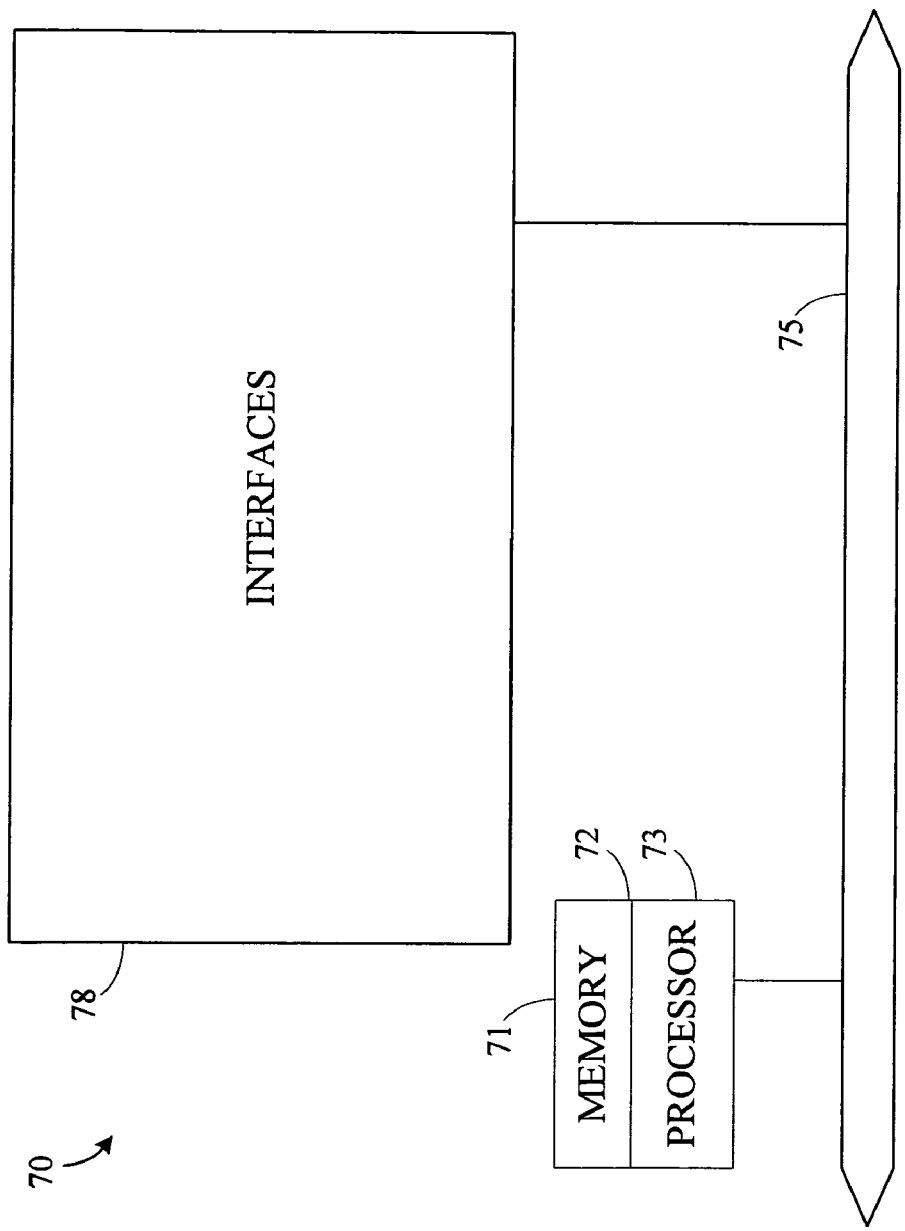
FIG. 7 is a block diagram of one example of a network device for use in implementing embodiments of the present invention.

FIG. 7 depicts a network device 70 that may be used to implement the method and system described above. In one embodiment, network device 70 is a programmable machine that may be implemented in hardware, software, or any combination thereof. Network device 70 includes a master central processing unit (CPU) 72, interfaces 78, and a bus 75 (e.g., a PCI bus). When acting under the control of appropriate software or firmware, the CPU 72 is responsible for implementing specific functions associated with the network device. It preferably accomplishes these functions under the control of software including an operating system and any appropriate applications. CPU 72 may include one or more processors 73. In an alternative embodiment, processor 73 is specifically designed hardware for controlling the operations of the network device 70. In a specific embodiment, memory 71 (such as non-volatile random access memory (RAM) and/or read-only memory (ROM) devices) also forms part of the CPU 72. However, there are many different ways in which memory could be coupled to the system.

The interfaces 78 are typically provided as interface cards (sometimes referred to as "linecards"). Generally, they control the sending and receiving of data packets over the network and sometimes support other peripherals used with the network device 70. Packet transmission operations may occur partially or completely within one of linecards. The interfaces generally include ports appropriate for communication with the appropriate media. To implement functionality according to the present invention, linecards may incorporate processing and memory resources similar to those discussed above in connection with the network device as a whole. In some embodiments, one or more interfaces 78 include at least one independent processor, which may be, for example, ASIC or any other suitable processor. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, and the like.

Regardless of the network device's configuration, it may employ one or more memories or memory modules (including memory 71) configured to store program instructions for the general-purpose network operations and other information relating to the functions described herein. The program instructions may control the operation of an operating system and/or one or more applications, for example.

Examples of machine-readable media that include program instructions for performing various operations described herein include, for example, magnetic media such as hard disks, floppy discs, and magnetic tape; optical media such as CD-ROM disks; magneto-optical media; and hardware devices that are specifically configured to store and perform program instructions, such as ROM and RAM. A carrier wave that carries the code across a network is another example of a computer-readable medium.

Network device 70 shown in FIG. 7 is only one example of a network device suitable for use with the invention. Other devices and systems having different configurations of subsystems may also be utilized. For example, other types of interfaces and media may also be used with the network device. The communication path between the interfaces/linecards may be bus based (as shown in FIG. 7) or switch fabric based (such as a cross-bar).

Hardware Example for Port ASIC

The following describes an example of hardware requirements for one embodiment of a port ASIC to implement satellites over an L2 network.

The L2 header is inserted in front of all packets. A header (e.g., CSH referenced above) may be inserted if an L2 mode using the header is enabled). The following is a format example:

DA (destination address)+SA (source address)+IEEE 802.1q Ethertype+

CoS (class of service)+TR+VLAN+CSH Ethertype+12 byte CSH The CSH may include, for example, destination and source port indices, virtual switch chassis identifier, and additional status and control information.

A single multicast address register is used (e.g., 5 bytes) per ASIC, and possibly per port for Metro Ethernet. Also, a VLAN register is used per port and a single source MAC register, per ASIC. The CoS is copied into the header and CSH from dbus into outermost L2 header. The TR bit is from register and the IEEE 802.1q Ethertype and CSH Ethertype are from register, per ASIC. The ASIC port is preferably configured to punt a well known multicast MAC address to a specific LTL index and to receive certain multicast MAC addresses that do not have CSH encapsulation (at least two such registers, preferably last byte maskable). A bit is provided to indicate that CSH encapsulation should not be done (or allocate two LTL indices for each port and program the $2^{nd}$ in the port ASIC as do not insert CSH).

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for interconnecting a satellite switch and a virtual switch for communication over a network, the method comprising:

transmitting at the satellite switch, a packet to the virtual switch, the packet comprising a source address of the satellite switch and a payload comprising a unique satellite identifier identifying the satellite switch, over the network;

receiving at the satellite switch, a response packet from the virtual switch, the response packet comprising a source address of the virtual switch and a payload comprising the unique satellite identifier, a satellite index associated with a port of the satellite switch, and a virtual switch index associated with a port of the virtual switch transmitting the response packet; and mapping at the satellite switch, the virtual switch index into a destination address, inserting the destination address into a satellite packet, and transmitting the satellite packet over the network to the virtual switch;

wherein the satellite switch comprises an access layer switch and the virtual switch comprises redundant distribution layer switches, the satellite switch relying on the distribution layer switches to perform forwarding functions.

2. The method of claim 1 wherein receiving a response packet comprises joining a multicast group containing the virtual switch.

3. The method of claim 1 wherein the network is a Layer 2 network.

4. The method of claim 3 wherein mapping the virtual switch index comprises mapping the virtual switch index to a VLAN field in an Ethernet header.

5. The method of claim 4 wherein a plurality of virtual switches are connected to the network and wherein each of said plurality of virtual switches belongs to a different VLAN.

6. The method of claim 1 wherein the response packet comprises a well known multicast destination address and wherein the satellite switch and the virtual switch both belong to a multicast group identified by the well known multicast destination address.

7. The method of claim 1 wherein the destination address is a multicast MAC address comprising an Organizational Unique Identifier field, a satellite communication field, and an index field containing the virtual switch index.

8. The method of claim 1 wherein the network is a Layer 3 network.

9. A method for controlling a satellite switch by a virtual switch over a network, the virtual switch, the method comprising:

receiving at the virtual switch, a packet from the satellite switch comprising a source address of the satellite switch and a payload comprising a satellite identifier, over the network;

transmitting at the virtual switch, a response packet to the satellite switch, the response packet comprising a source address identifying the virtual switch and a payload comprising the satellite identifier, a satellite index associated with a port of the satellite switch, and a virtual switch index associated with a port of the virtual switch transmitting the packet; and mapping at the virtual switch, the satellite switch index into a destination address, inserting the destination address into a satellite packet, and transmitting the satellite packet over the network to the satellite switch;

wherein the virtual switch comprises redundant network devices, each of the network devices operable to replace the other network device and perform layer 2 or layer 3 forwarding functions for the satellite switch.

10. The method of claim 9 wherein mapping the satellite switch index comprises mapping the satellite switch index to a VLAN field in an Ethernet header.

11. The method of claim 9 wherein a plurality of virtual switches are connected to the network and wherein each of said plurality of virtual switches belongs to a different VLAN.

12. The method of claim 9 wherein the destination address is a multicast MAC address comprising an Organizational Unique Identifier field, a satellite communication field, and an index field containing the satellite switch index.

13. An apparatus for interconnecting a satellite switch and a virtual switch comprising redundant network devices for communication over a network, the apparatus comprising:

a processor for:

transmitting at the satellite switch, a packet to the virtual switch, the packet comprising a source address of the satellite switch and a payload comprising a unique satellite identifier identifying the satellite switch, over the network;

receiving at the satellite switch, a response packet from the virtual switch, the response packet comprising a source address of the virtual switch and a payload comprising the unique satellite identifier, a satellite index associated with a port of the satellite switch, and a virtual switch index associated with a port of the virtual switch transmitting the response packet; and mapping at the satellite switch, the virtual switch index into a destination address, inserting the destination address into a satellite packet, and transmitting the satellite packet over the network to the virtual switch; and memory for storing the unique satellite identifier;

wherein the satellite switch comprises an access layer switch and the virtual switch comprises redundant distribution layer switches, the satellite switch relying on the distribution layer switches to perform forwarding functions.

14. The apparatus of claim 13 wherein a plurality of virtual switches are connected to the network and wherein each of said plurality of virtual switches belong to a different VLAN.

15. The apparatus of claim 13 wherein the response packet comprises a well known multicast destination address and wherein the satellite switch and the virtual switch both belong to a multicast group identified by the well known multicast destination address.

16. The apparatus of claim 13 wherein the destination address is a multicast MAC address comprising an Organizational Unique Identifier field, a satellite communication field, and an index field containing the virtual switch index.

17. An apparatus for controlling a satellite switch by a virtual switch over a network, the virtual switch, the method comprising:

receiving at the virtual switch, a packet from the satellite switch comprising a source address of the satellite switch and a payload comprising a satellite identifier, over the network;

transmitting at the virtual switch, a response packet to the satellite switch, the response packet comprising a source address identifying the virtual switch and a payload comprising the satellite identifier, a satellite index associated with a port of the satellite switch, and a virtual switch index associated with a port of the virtual switch transmitting the packet; and mapping at the virtual switch, the satellite switch index into a destination address, inserting the destination address into a satellite packet, and transmitting the satellite packet over the network to the satellite switch;

wherein the virtual switch comprises redundant network devices, each of the network devices operable to replace the other network device and perform layer 2 or layer 3 forwarding functions for the satellite switch.

18. The apparatus of claim 17 wherein mapping the satellite switch index comprises mapping the satellite switch index to a VLAN field in an Ethernet header.

19. The apparatus of claim 17 wherein a plurality of virtual switches are connected to the network and wherein each of said plurality of virtual switches belongs to a different VLAN.

* * * * *